May 10, 1927.

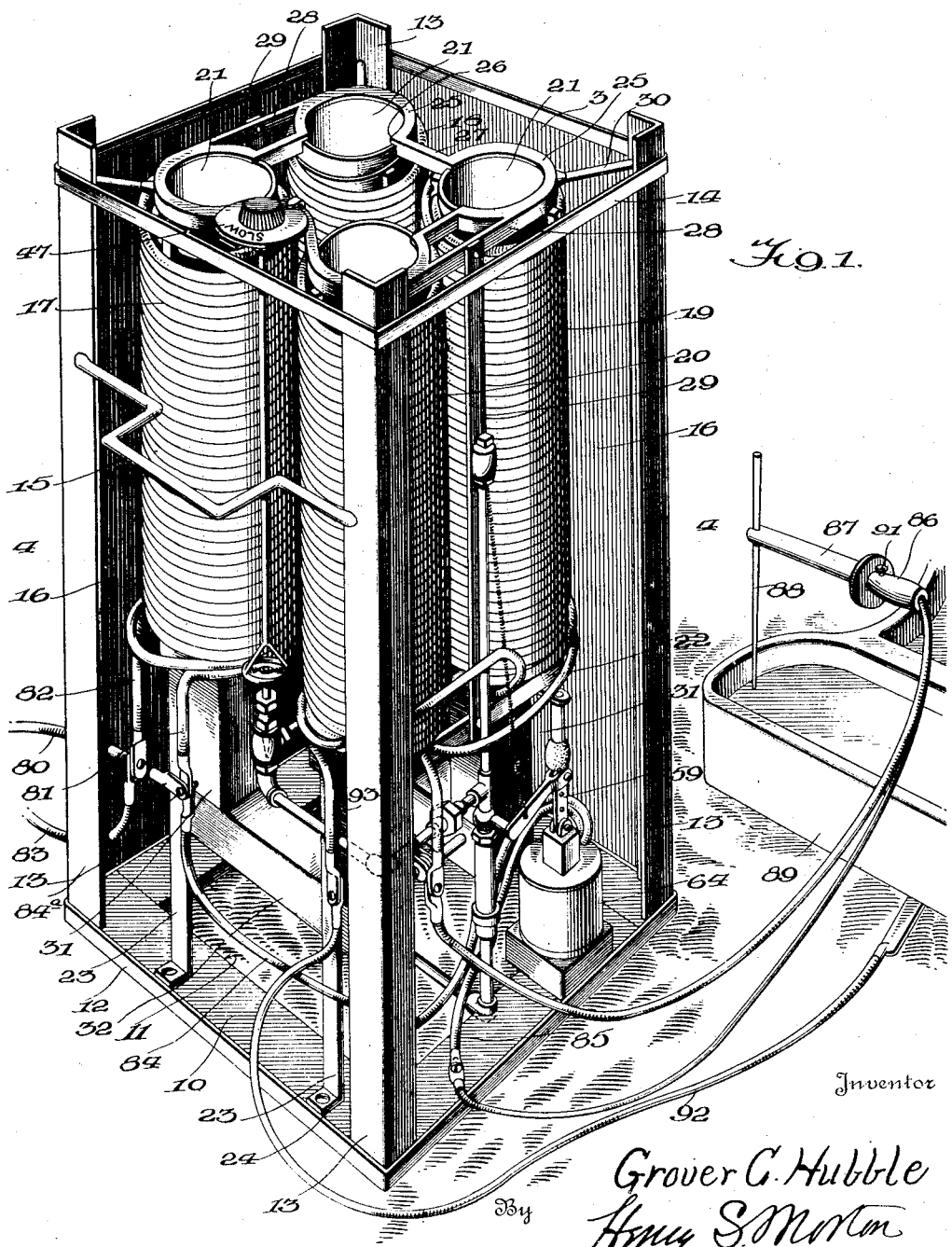

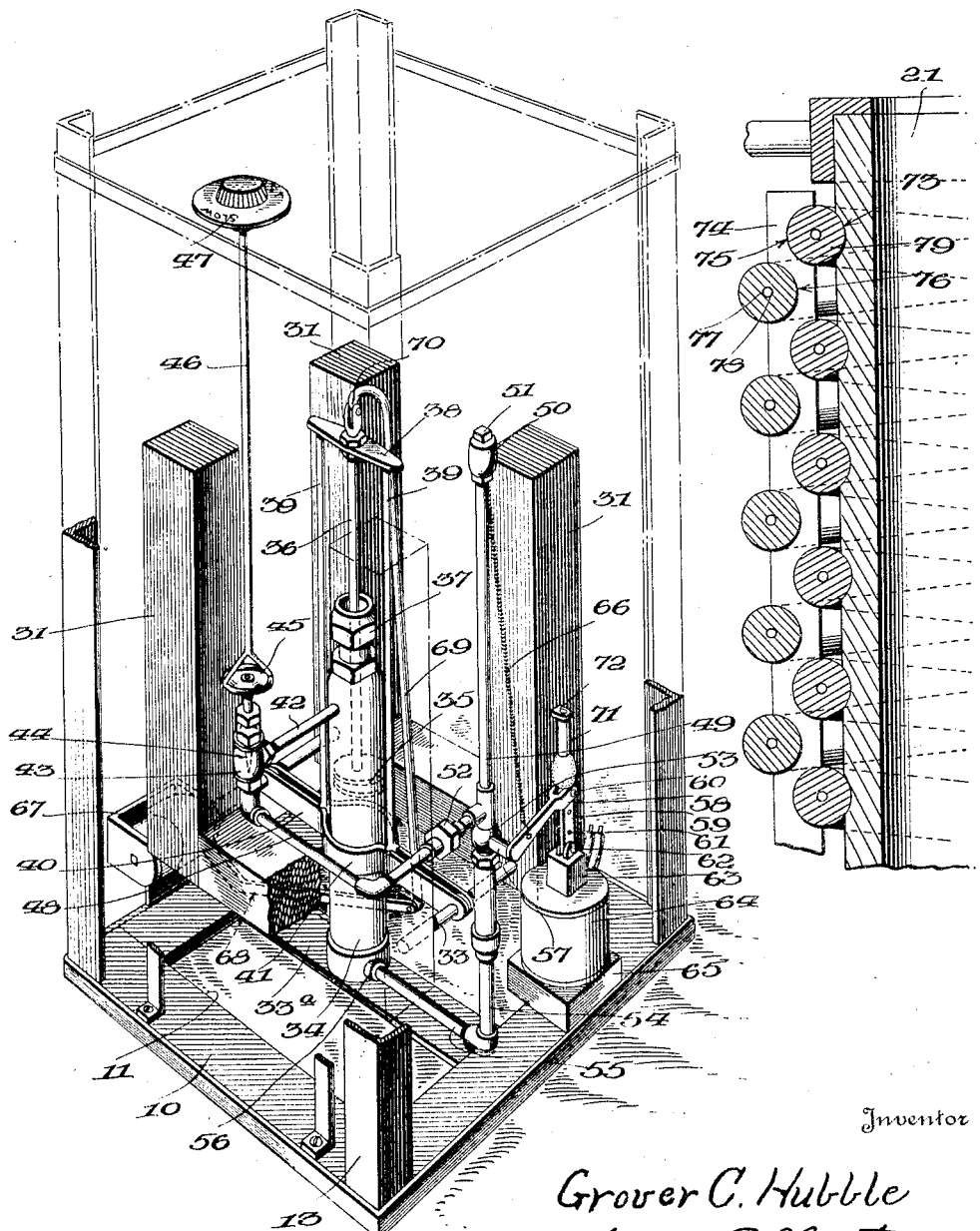

G. C. HUBBLE

ARC WELDING MACHINE

Filed March 20, 1926  3 Sheets-Sheet 3

1,628,148

Inventor
Grover C. Hubble
By Henry S. Norton
Attorney

Patented May 10, 1927.

1,628,148

UNITED STATES PATENT OFFICE.

GROVER CLEVELAND HUBBLE, OF BONNERS FERRY, IDAHO.

ARC-WELDING MACHINE.

Application filed March 20, 1926. Serial No. 96,324.

This invention relates to arc welding machines of the type described and claimed in my co-pending application Serial No. 61,106, filed October 7, 1925.

It is essential in welding operations that the welder should give at all times careful attention to the work or parent metal to prevent not only burning the metal of the work but to prevent the intensely heated welding electrode from burning through thin portions of the work as in cases of welding flume pipes, gasoline tanks and other articles formed of relatively thin metal.

In order to strike an arc to initiate welding for producing a sound weld, it is necessary to employ a larger amperage particularly when the work or parent metal is cold than a few seconds after the arc has been struck for then the temperature of the work is at a maximum and continued application of the welding electrode at this time will result in burning of the work. To avoid this the operator finds it necessary to break the arc and wait until the work has cooled sufficiently to permit continuance of the operation.

It has been proposed to construct arc welding machines which will provide, when the arc is struck, a fixed amperage which is regulated by some well-known electrical means embodied in a welding machine. Due to the fact that the machine is remotely located from the work and likewise the operator it is necessary for the welder to break the arc and return to the machine in order to actuate the electrical means for controlling the amperage in an attempt to regulate, in an approximate manner, the temperature for continuing the welding operation. This method of regulation requires frequent trips to the welding machine in view of the varying conditions met with in the work. It is therefore highly important that the control of the amperage to determine the required temperature at all times be in the hands of the welder for effective welding under all conditions.

It is an object of the present invention to provide a device effective for welding under all conditions whereby the amperage may be controlled at the will of the welder and at a point which may be remote from the machine but which is convenient to the work so that the welder will not be required to break the arc and return to the machine for an adjustment of the controls.

Another object of the invention is the provision of a device for arc welding in which the control of the amperage and therefore the regulation of the temperature at the terminals of the arc is directly and conveniently in the hands of the operator, and in which device is included a reactance and a movable core adjustable relative to the reactance and the positive position of the core being determinable at the will of the welder.

A further object of the invention is the provision of a balanced reactance including a plurality of coils in which the flux is confined to the coils so that the field is concentrated in the immediate region of the coils, enhancing the value of the reactance.

A still further object of the invention is the provision of an arc welding machine in which a plurality of reactance coils are so arranged and interconnected for use with an alternating current circuit that the flow of current across the arc will be stabilized, thus not only increasing the efficiency of the arc but providing for a deeper penetration of the weld, the arrangement of the coils being such that one coil will have an opposite polarity to an adjacent coil.

Another object of the invention is the provision of a reactance disposed between both terminals of an arc and the poles of an alternating current supply for stabilizing the flow of current across the arc with means operated remotely from the reactance for controlling at will the amount of amperage at the arc.

This invention will be best understood from the following detailed description in view of the accompanying drawings, although it is to be understood that the invention is not to be confined to the disclosure, being susceptible of modifications which involve no material departure from the important features of the invention as set forth in the claims.

In the drawings:

Figure 1 is a view in perspective of an arc welding machine constructed in accordance with the principles of my invention, with the cover plates removed.

Figure 2 is a view in perspective of the operating means for the solenoid of my arc welding machine.

Figure 3 is a fragmentary longitudinal section along the line 3—3 of Figure 1.

Figure 4:
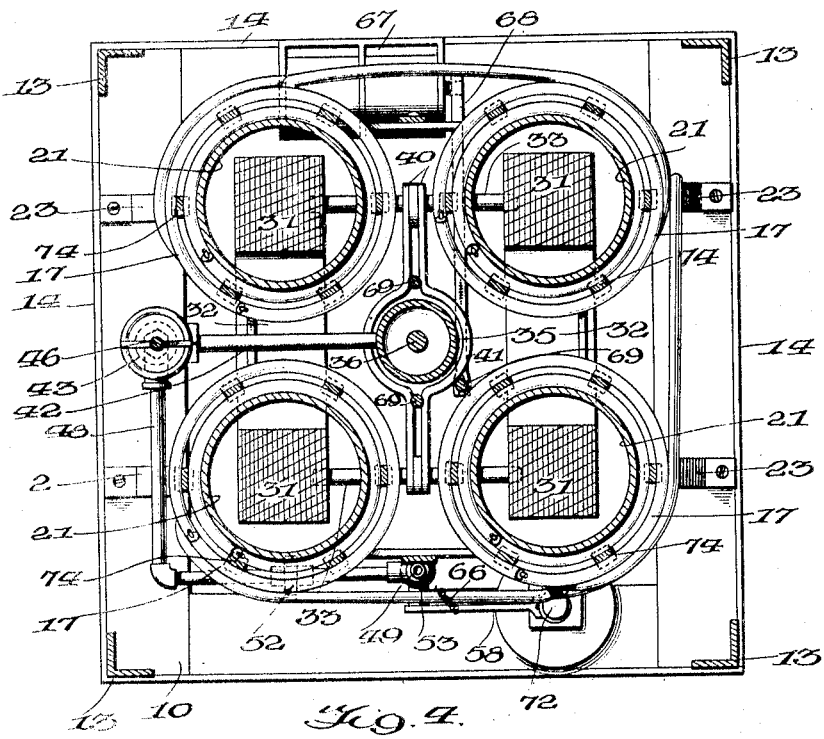
Figure 4 is a horizontal section taken along the line 4—4 of Figure 1.

Referring more particularly to the drawings, 10 designates a base member which has a central opening as shown at 11 for the purpose of lessening the weight of the device and the base member is preferably made of four rectangular pieces of flat metal secured together at their opposite ends. The base member, at its periphery, is provided with an upstanding flange 12 which receives at the four corners of the base member angle iron uprights 13. These uprights are secured in any approved manner to the flange 11 and the base member 10. A metal endless strap 14 is secured to the outer faces of the uprights 13 adjacent their upper ends.

Upon opposite sides of the device and connected to a pair of the uprights is a handle 15 which is spaced from the cover plates 16 so that the same may be conveniently grasped by the hand for carrying the arc welding machine. It will be noted that two of the side plates 16 are shown in position in Figure 1, while the other two plates have been removed to permit an interior view of the important operating elements of the machine.

Four coils 17, 18, 19 and 20 are enclosed within the main supporting shell. Each of the coils is formed on a cylinder 21 of insulating material. A pair of cylinders rest at their lower ends upon a support 22 which is formed of a bar of suitable metal bent at its ends to receive the lower ends of a pair of the shells, with bracket arms 23 having their upper ends connected to the bent portions of the bars 22 and feet 24 at their lower ends secured in any approved manner to the base member 10.

The upper end of each cylinder 21 is embraced by a curved member 25 having a flange 26 forming with the curved member 25 a shoulder which embraces the upper edge of each cylinder. The ends of the curved members are connected by bars 27 while an additional reinforcing bar 28 is connected to a pair of the curved members at opposite sides of the cylinders. The supporting structure just described for the upper end of the cylinders is preferably cast integrally. Straps 29 are connected at their upper ends to the reinforcing bars 28, with the lower ends of the straps being connected to the supporting bars 22 located adjacent the lower end of the coils.

A rod 30 connected to the upper end of an upright 13 extends diagonally inwardly and has its inner end secured to the outer face of a curved member 25 whereby the supporting structures for the upper ends of the coils are held against movement.

Movable longitudinally of each cylinder 21 is a core 31. A pair of the cores are connected together by a bridging member 32 and said bridging members are rigidly connected together by means of rods 33. These rods are located at right angles to the bridging members 32.

A supporting plate 33ª is connected across the opening 11 in the base member 10 and to opposite sides of said base member and upon which is mounted a cylinder 34. This cylinder extends longitudinally upwardly and is disposed centrally of the main supporting structure and between the coils 17 to 20 inclusive. A piston 35 is movable within the cylinder and is connected to the lower end of a piston rod 36 which projects beyond a packing 37 and is connected to a cross head 38. Extending downwardly from the cross head and secured to the ends thereof are a pair of rods 39. The lower ends of the rods are connected to a pair of straps 40 having perforations received by the transverse rods 33. These straps are spaced from each other and intermediate their ends are provided with curved portions 41 which embrace the cylinder 34 and spaced from said cylinder, so that the straps may be moved in a vertical direction in embracing relation with said cylinder. The rods 39 are connected to the straps 40 at a point adjacent where the curved ends merge into the straight portions of the straps.

The upper end of the cylinder 34 is connected by means of a pipe 42 to a needle valve casing 43 in which is mounted a needle valve 44 operated by the member 45. An operating rod 46 connected at its lower end to the member 45 extends upwardly and beyond the upper end of the top of the supporting structure, where it is provided with a finger piece 47. Valve casing 43 is connected by an elbow 48 to a stand pipe 49, the stand pipe having an enlargement 50 at its upper end and a threaded cap 51 which is adapted to be moved so that the pipe may be filled with oil and the parts associated therewith. A union 52 interposed in the elbow 48 provides a means for removing said elbow when desired.

A valve 53 is interposed between the vertical pipe 54, which is located below the stand pipe 49, and a pipe 55 which connects pipe 54 with the bottom of the cylinder 34 as shown at 56. Valve 53 has a crank 57 connected thereto for operating the same. The outer free end of the crank, as shown at 58, is connected with a rod 59 by means of a pin 60 adapted to be inserted within any one of a plurality of perforations 61. This rod, as shown at 62, is pivotally connected with a core 63 of a solenoid 64, the solenoid being mounted upon a block 65 carried by the base member 10. A spring 66 has one end connected to the crank 57 and the other end to the enlargement 50 which will tend to aid in raising the crank and for closing the valve 53 when the circuit to the solenoid has been opened.

The cylinder 34 and the pipes connecting the opposite ends of the cylinder with each other, are adapted to be filled with a sufficient quantity of oil so that the oil will be in contact with opposite sides of the piston 35. It will be appreciated that any suitable fluid may be employed in the fluid motor for purposes which will be presently explained.

The rod 59 is provided with an extension 71 having a laterally projecting lug 72 adapted to engage the supporting bar 22 at one side of the device for limiting the upward movement of the crank arm 57 by the spring 66 when the solenoid 64 has released the core 63 and in which position the valve 53 is held closed in order to prevent the flow of fluid from one side of the piston 35 to the opposite side. It will be noted that the valve 53 is disposed substantially midway between the horizontal levels of the pipes 42 and 55.

The spring motor 67 is carried by the base member 10 and has an arm 68 extending inwardly and terminating adjacent the cylinder 34 and has its inner end connected by means of a rod 69 to the cross head 38. A pivotal connection, as shown at 70, provides for the proper oscillating movement of the rods 69 during upward or downward movement of the cross head 38. The spring motor tends at all times to raise the arm 68 and thereby elevate the cross head 38, piston 35 and the cores 31.

Referring more particularly to Figure 3 it will be seen that each cylinder 21 is provided with grooves 73 helically arranged to receive the inner wrapping of the coil. Insulating strips 74 are arranged circumferentially of the coil and in spaced relation and are provided with grooves 75 along the inner edge to receive the inner wrapping of the wires, while the opposite longitudinal edge is provided with grooves 76 adapted to receive the outer wrapping of the wires. It will be also noted that the grooves 73 and 76 are disposed in staggered relation so that air may pass upwardly through the wires as well as through the cylinders 21. A pair of wires 81 and 82 are located in spaced parallel relation and arranged alternately in each layer of the coil and any number of layers may be employed which will be consistent with an efficient operation of the device. Preferably, each wire may consist of an insulated cable having a core comprising two insulated wires, one wire of each coil being connected in series and with one pole of the current source and with one terminal of the arc, while the other wires of each cable are connected in series and between the other pole of the source of current supply and the other arc terminal.

Furthermore the wrapping of the coil 17 on its respective cylinder is in reverse order to the wrapping of the coil 18 so that while the coil 17 is a north pole coil, 18 will be a south pole and coil 19 is wrapped reversely to that of coil 18 so that coil 19 would, in such a case, be a north pole while coil 20 would be a south pole, because of the fact that it is wrapped in an opposite direction to that of coil 19. By such an arrangement it will be noted that any pair of the coils will have opposite polarity and the magnetic flux is thus confined entirely within the coil and tests for magnetic influence beyond the coils have shown that no magnetic influence can be noticed.

Wire 82, which forms one half the turns of the coils, is connected to the input lead 83 of an alternating current circuit, while the wire 81 which forms the other half of the turns of the coils, is connected to the output lead 80 of said circuit. A wire 84 is connected with the wire 81 as shown at 84ª and to the solenoid 64. A wire 85 is extended from the solenoid 64 to the handle 86 of an electrode holder 87 which carries the electrode 88 and is adapted to partially complete the circuit through the work or parent metal 89. The handle 86, as shown diagrammatically in Figure 5, is provided with a switch 90 having a push button 91, one member of the switch being connected to the wire 85, while the other member of said switch is connected by means of a wire 92 shown in Figure 5 and representing the electrode 88 in Figure 1, the circuit being completed by the lead 93 in Figures 1 and 5.

Figure 5:
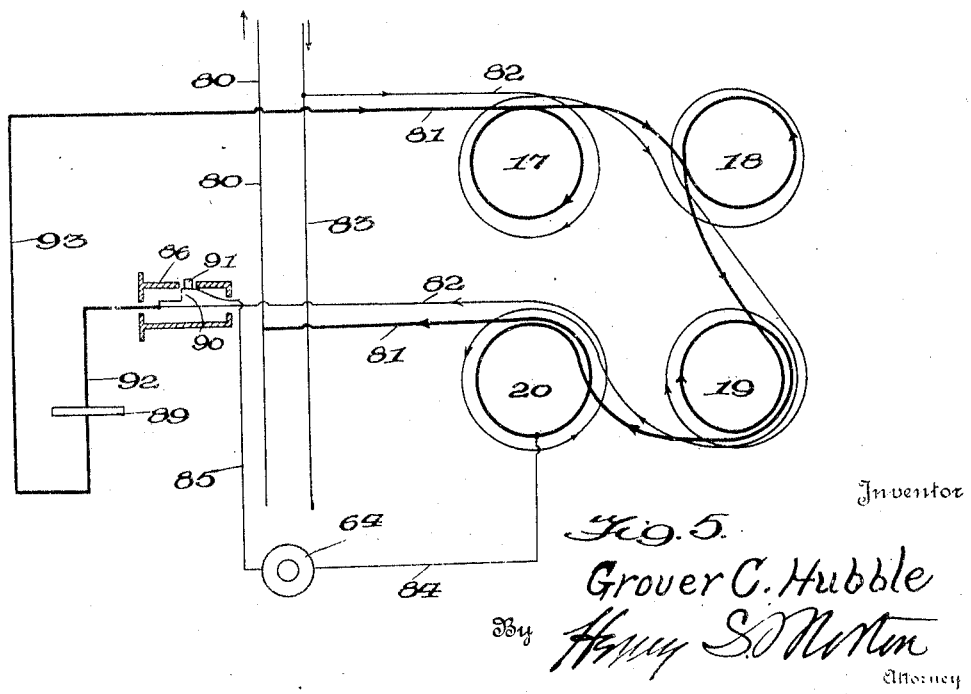
Figure 5 is a wiring diagram of the entire circuit of the device.

Referring more particularly to the diagram in Figure 5, it will be seen that the wires 81 and 82 are wound in parallel relation in each of the coils but in opposite direction to an adjacent coil so that during the pulsations of the alternating current the current will flow in opposite directions through exactly the same path and through the same length of wire setting up a magnetic flux in the coils and through which the cores 31 are moved to control the reactance.

The operation of my device is as follows:

The leads 80 and 81 are connected to an alternating current supply as shown in Figure 5 whereby the pulsations will travel along wire 82 and return in the opposite direction over wire 81 as soon as an arc has been struck between the electrodes 88 and the parent metal 89. The voltage at this time may be anywhere from 75 to 90, but the voltage readily drops across the arc due to the control by means of the reactance including the coils and the movable cores 31. A few seconds after the arc has been struck the temperature of the parent metal or work rises to such an extent that either the parent metal will be burned through if sufficiently thin or the metal where the work has sufficient thickness will be burned. At such time the welder presses the button 91 for closing the switch 90. This places the solenoid 64 in circuit and the rod 59 is moved downwardly, operating the crank 57 against the tension of the spring 56 whereby the valve 53 is opened breaking the equilibrium of the fluid in the fluid motor so that the piston 35 may be moved in any direction desired, and whereby the fluid from the top of the piston may be forced through the pipes 42, 43, 54 and 55 to the bottom of the cylinder and below the piston 35. At this time the cores 31 are magnetically withdrawn within the coils and the spring motor 67 tends to raise the arm 68 and assists in elevating the cores 31 thereby reducing the amperage across the arc and thus lessening the heat.

It will be appreciated that as long as the arc is struck the cores 31 will be magnetically impelled into the coils so that when the valve 53 is released to permit the flow of the oil, the spring motor and magnetic impulsion will raise the cores. If the temperature, at any time of the arc is decreased which is not satisfactory for welding purposes, the arc may be broken and the push button operated to close the switch 90, again setting the solenoid 64 into operation, whereby the rod 59 will be depressed, operating the crank 57 and again opening the valve 53. At this time the magnetic influence on the cores has been eliminated and therefore the cores will tend to drop by their own weight against the action of the motor 67. The piston 35 moving downwardly will force the fluid from the bottom of the cylinder 34 outwardly through the piping system through the pipe 42 into the top of the cylinder and at the other side of the piston 35. It is only necessary for the welder to release the button 91 for opening the switch to stop the downward or upward movement of the cores 41 and by which action it is possible for the operator to position the core at any point desired for controlling at will the amperage and likewise the degree of heat at the arc.

Sometimes conditions are met with in which a substantially uniform crack is found in the parent metal which may be welded by a gradual and uniform decrease in the temperature of the arc. At such a time the needle valve 44 may be operated through the finger piece 47 for restricting the flow of the fluid through the piping and to opposite sides of the cylinder 34 so that when the switch 90 is closed and the arc has been struck the core will be moved at a predetermined speed into the coils. The timing of the descent of the cores 31 by gravity is also controlled by the manipulation of the needle valve 41.

Because of the peculiar construction of the reactance coil the alternating current flows in one direction through the coil in both wires in each cycle. This flow of current through the reactance coil sets up a magnetic flux in the core. It will be noted that the core is not a closed magnetic circuit as in the transformer. The alternating current in passing through the reactance coil cuts the lines of magnetic flux, setting up an electromotive force which must, of necessity, flow through the windings of the reactance coil. The resultant current flowing out of the reactance coil and across the welding arc has all the characteristics of direct current, having lost the pulsating surges, so characteristic of alternating current.

It will thus be seen that I have provided a simple, efficient and durable device which can be automatically operated to sensitively adjust the degree to which a reactance coil, by reason of its inductance, can affect the voltage and energy or heat supplied across a welding arc. The voltage may be anywhere from 75 to 90 volts when the arc is struck. Immediately thereafter the voltage drops to approximately 16 to 18 volts and the closer the operator holds the electrode to the work or parent metal, the lower the voltage will remain, and if the operator lengthens his welding arc by moving his electrode further from his work, the voltage will automatically rise and still cause the same amount of current to flow across the welding arc, or in other words, the heat or energy across the welding arc will remain at the desired degree as established by the position of the cores in the reactance coils.

While I have shown and described an arc welding machine in which the current flowing across the arc terminals and therefore the temperature of the arc, is sensitively controlled, it will be appreciated that the device may be employed under any condition where an arc is necessary, and more particularly where an arc is in circuit with an alternating current.

The flux does not travel over the rods 33 because the bars 32 which connect pairs of the poles afford the path of least resistance and also because of the fact that each coil has the same number of turns, the wire 81 supplying half the turns while the wire 82 forms the other half of the turns of the coil. The wires 81 and 82 are continuous so that a pair of single wires complete all the turns of the coils.

While I have shown the coils in cores located more conveniently in a vertical position it will be appreciated that said coils may assume any position between the horizontal and vertical for effective operation. The vertical disposition of the coils, however, provide for a better circulation of the air through the wires and more convenient means for direct operation of the cores through the force of gravity without necessitating additional mechanism for causing a downward movement of the cores.

The machine has a wide range and is capable of employing any size electrode from the smallest to the largest without requiring additions or variations in the structure thereof.

What I claim is:

1. In an alternating current electric arc forming circuit including a source of alternating current supply, a reactance disposed between each terminal of the arc and the poles of the alternating current supply, and means adapted to be controlled at will and remotely from the coils for regulating the voltage and amperage across the arc.

2. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, and means for automatically actuating the last mentioned means.

3. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, and means for automatically actuating the last mentioned means, said last mentioned means including means adapted to be set in motion by the alternating current supply.

4. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, means for automatically actuating the last mentioned means, and a timing means for regulating the automatic means.

5. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, a movable core for the reactance, and operating means for predeterminedly positioning the core relative to the reactance at the will of the operator.

6. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, a movable core for the reactance, operating means for predeterminedly positioning the core relative to the reactance at the will of the operator, and means for controlling the operating means remotely from the reactance.

7. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, a movable core for the reactance, operating means for predeterminedly positioning the core relative to the reactance at the will of the operator, and means for causing timing of the speed of movement of the core.

8. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, a movable core for the reactance, operating means for predeterminedly positioning the core relative to the reactance at the will of the operator, said operating means including an electrical means having an open circuit connected with the alternating current supply for setting in operation said operating means, and means remotely located from the reactance for closing the open circuit.

9. In an alternating current electric arc forming circuit including a source of alternating current supply, a reactance disposed between each terminal of the arc and the poles of the alternating current supply, means adapted to be controlled at will and remotely from the coils for regulating the voltage and amperage across the arc, a movable core for the reactance, operating means for predeterminedly positioning the core relative to the reactance at the will of the operator, said operating means including an electrical means having an open circuit connected with the alternating current supply for setting in operation said operating means, means remotely located from the reactance for closing the open circuit, and means for controlling the speed of actuation of the operating means.

10. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and means for retaining the core in a predetermined position relative to the coil at the will of the operator.

11. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, and means for causing said retaining means to release the core.

12. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, means for causing said retaining means to release the core, and means for restraining the retaining means when the core is released for varying the speed of movement of the core.

13. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being constructed to be magnetically impelled in an opposite direction.

14. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being magnetically impelled in an opposite direction, and means for assisting the magnetic impulsion of said core.

15. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being constructed to be magnetically impelled in an opposite direction, automatic means for resisting the force of gravity on the core and for assisting the magnetic impulsion of said core.

16. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being magnetically impelled in an opposite direction, and means for assisting the magnetic impulsion of said core, and releasing means for the retaining means, means for causing restraining of the releasing means or the assisting means and the magnetic impulsion of the core for timing the speed of movement of the core in either direction.

17. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being magnetically impelled in an opposite direction, means for assisting the magnetic impulsion of said core, and means for timing the speed of movement of the core in either direction.

18. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator.

19. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator, said motor including a piston connected to the core, and means for maintaining the fluid in supporting relation with the piston.

20. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, means for retaining the fluid in supporting relation with the piston, and means for causing actuation of the last mentioned means, remotely from the reactance coil and adjacent the arc, to release the fluid.

21. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, means for maintaining the fluid in supporting relation with the piston, and means for restraining the release of the fluid for timing the speed of movement of the piston and core.

22. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, a cylinder for the piston, a conduit connecting the opposite ends of the cylinder, a valve interposed in the conduit for preventing flow between the opposite ends of the piston, and means under the control of the operator for causing actuation of the valve.

23. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, a cylinder for the piston, a conduit connecting the opposite ends of the cylinder, a valve interposed in the conduit for preventing flow between the opposite ends of the piston, a second valve in the conduit for restraining the flow of the fluid through the conduit, and means under the control of the operator for causing actuation of the valve.

24. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, a cylinder for the piston, a conduit connecting the opposite ends of the cylinder, a valve interposed in the conduit for preventing flow between the opposite ends of the piston, and an electrical means under the control of the operator for causing actuation of the valve.

25. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, a solenoid operatively connected with the valve, a welding electrode handle, a switch in the handle, a circuit connected to the source of alternating current supply, said solenoid and switch being in the second mentioned circuit.

26. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, a valve for controlling the fluid motor, a solenoid operatively connected with the valve, a welding electrode handle, a switch in the handle, a circuit connected to the source of alternating current supply, said solenoid and switch being in the second mentioned circuit.

27. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, a fluid motor for retaining the core in a predetermined position relative to the coil at the will of the operator, said motor including a piston connected to the core, a valve for controlling the fluid motor, a solenoid operatively connected with the valve, a welding electrode handle, a switch in the handle, a circuit connected to the source of alternating current supply, said solenoid and switch being in the second mentioned circuit.

28. In an alternating current electric welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being magnetically impelled in an opposite direction, a spring motor, an arm connected with the motor and core, said motor tending to actuate the arm to assist the magnetic impulsion of said core, and means for timing the speed of movement of the core in either direction.

29. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, means for retaining the core in a predetermined position relative to the coil at the will of the operator, said core being magnetically impelled in an opposite direction, a spring motor, an arm connected with the motor and core, said motor tending to actuate the arm to assist the magnetic impulsion of said core.

30. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator, and an electrical means under the control of the operator for causing the motor to release the core.

31. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator, and means for causing timing of the speed of movement of the core in opposite directions.

32. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator, and a valve for causing timing of the fluid motor and for controlling the speed of movement of the core.

33. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator, a valve for causing timing of the fluid motor and for controlling the speed of movement of the core, and a valve for releasing the fluid motor to permit actuation of the core.

34. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coil, and a fluid motor for retaining the core in a predetermined position relative to the coil at the will of the operator, a valve for causing timing of the fluid motor and for controlling the speed of movement of the core, a valve for releasing the fluid motor to permit actuation of the core, and means for causing actuation of the second mentioned valve and adapted to be controlled remotely from the coil.

35. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coils, and means for retaining the core in a predetermined position relative to the coils at the will of the operator, said coils being connected in series.

36. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coils, and means for retaining the core in a predetermined position relative to the coils at the will of the operator, said coils being connected in series, said coils being so arranged that each adjacent pair of coils have opposite polarity.

37. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coils, and means for retaining the core in a predetermined position relative to the coils at the will of the operator, said coils being connected in series, one coil being reversely wound to that of an adjacent coil.

38. In an alternating current electric arc welding machine adapted to be connected with a source of alternating current supply, arc terminals, a reactance coil interposed between each terminal of the arcs and the poles of the alternating current supply, a core movable by gravity in one direction for varying the reactance of said coils, and means for retaining the core in a predetermined position relative to the coils at the will of the operator, said coils being connected in series, said coils being formed of a pair of wires wound side by side.

39. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coils, and means for retaining the core in a predetermined position relative to the coils at the will of the operator, said coils being connected in series, the wires of the coils being spaced from each other.

40. In an alternating current electric arc welding machine adapted to be connected with a source of alternating current supply, arc terminals, a reactance coil interposed between each terminal of the arc and the poles of the alternating current supply, a core movable by gravity in one direction for varying the reactance of said coils, and means for retaining the core in a predetermined position relative to the coils at the will of the operator, said coils being connected in series, said coils being formed of a pair of wires wound side by side, each wire having an end connected to an arc terminal, the other end of each wire being connected to a pole of the alternating current supply.

41. In an alternating current electric arc welding machine adapted to be connected with a source of alternating current supply, arc terminals, reactance coils comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit.

42. In an alternating current electric arc welding machine adapted to be connected with a source of alternating current supply, arc terminals reactance coils comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, said coils being so arranged that each adjacent pair of coils have opposite polarity.

43. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the course of the current supply, and the remaining terminals of the wires being connected to the arc terminals of said circuit, the pair of wires on one coil being oppositely wound to that of an adjacent coil.

44. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, each coil having the same number of turns.

45. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, and a core for each coil.

46. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, a core for each coil, and means for bridging a pair of the cores.

47. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, a core for each coil, said cores being movable downwardly by gravity.

48. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, a core for each coil, said cores being movable downwardly by gravity, the cores being adapted to be magnetically impelled in the opposite direction.

49. In an alternating current electric arc welding machine adapted to be connected with a source of alternating current supply, arc terminals, reactance coils arranged vertically and comprising a pair of continuous wires wound side by side, the terminals of one wire being connected to a pole of the source of current supply, the opposite terminal of the other wire connected to the remaining pole of the source of the current supply, and the remaining terminals of the wires being connected to the arc terminals of said circuit, a core for each coil, said cores bing movable downwardly by gravity, the cores being adapted to be magnetically impelled in the opposite direction, and means for assisting the magnetic impulsion of the cores.

In testimony whereof I affix my signature.

GROVER C. HUBBLE.